United States Patent
Hsieh

(10) Patent No.: US 6,517,318 B2
(45) Date of Patent: Feb. 11, 2003

(54) BUFFER PAD FOR USE IN AN ELECTRIC FAN

(76) Inventor: Hsin-Mao Hsieh, No. 6, East Section, Chiao Nan Li, Industrial 6th Rd., Pingtung City, Pingtung Hsien (TW)

(*) Notice: Subject to any disclaimer, the term of this patent is extended or adjusted under 35 U.S.C. 154(b) by 36 days.

(21) Appl. No.: 09/734,985

(22) Filed: Dec. 11, 2000

(65) Prior Publication Data

US 2002/0070327 A1 Jun. 13, 2002

(51) Int. Cl.[7] .............................................. F04D 29/04
(52) U.S. Cl. ........................ 416/174; 416/244; 415/119
(58) Field of Search ................................. 416/174, 500, 416/244; 415/119, 176, 178

(56) References Cited

U.S. PATENT DOCUMENTS 6,246,140 B1 * 6/2001 Horng .......................... 310/91

* cited by examiner

Primary Examiner—Edward K. Look
Assistant Examiner—James M McAleenan
(74) Attorney, Agent, or Firm—Dellett & Walters

(57) ABSTRACT

A buffer pad is provided for use in an electric fan that has a blade assembly and a spindle extending from the blade assembly and rotatably supported in a bearing. The spindle further has a distal end extending beyond the bearing. The inventive buffer pad includes a wear-resistant piece for abutting the distal end of the spindle, and a resilient body adapted to be held in place within the electric fan for resiliently supporting the wear-resistant piece. The buffer pad can absorb vibrations generated by the rotary blade assembly.

7 Claims, 3 Drawing Sheets

BUFFER PAD FOR USE IN AN ELECTRIC FAN

BACKGROUND OF THE INVENTION

1. Field of the Invention

The present invention relates to a buffer pad and, more particularly, to a buffer pad for use in an electric fan to absorb vibrations generated by a rotary blade assembly.

2. Description of Related Art

It is well known that there are many types of electric fans. FIG. 3 illustrates an electric fan that includes a frame (60) having a central sleeve (61) with a circuit board (62) and an armature (63) mounted therearound and with a bearing (64) fitted tightly therein.

The electric fan further includes a blade assembly (65) having a spindle (66) rotatably supported in the bearing (64), in which the spindle (66) is retained by a retainer ring (67) that is held on a distal end of the spindle (66) below the bearing (64). A sticky sheet (68) is adhered to the frame (60) to close a bottom opening of the sleeve (61).

The problem of the electric fan is that it must be inverted just before the retainer ring (67) is fitted to the distal end of the spindle (66). Apparently, the inversion increases the time required for the assembly of the fan, especially in mass production.

FIG. 4 shows an electric fan that includes a frame (70) having a central chamber (71) defined by a tubular portion (72). Firmly mounted around the tubular portion (72) is a sleeve (73) in which a bearing (74) is fitted tightly and a resilient retainer ring (77) is held between the bearing (74) and the tubular portion (72).

A blade assembly (75) is provided with a spindle (76) rotatably supported in the bearing (74). In this electric fan, the spindle (76) can be easily retained in the bearing (74) simply by pressing the blade assembly (75) in such a way that a distal, round end of the spindle (76) is squeezed through an aperture of the resilient retainer ring (77) until the ring (77) snaps into a neck of the spindle (76), when the round end of the spindle (76) additionally abuts a pad (78) positioned at a bottom of the chamber (71).

Accordingly, the assembly of the second-mentioned fan can be performed without inverting it, and the chamber (71) can be used as an oil reservoir to lubricate the bearing (74). However, the illustrated electric fans share a common problem that they may be noisy in operation, since no means are provided for absorbing vibrations generated by the rotary blade assembly.

Therefore, it is an objective of the invention to provide a buffer pad for use in an electric fan to mitigate and/or obviate the aforementioned problems.

SUMMARY OF THE INVENTION

The object of the present invention is to provide a buffer pad for use in an electric fan to absorb vibrations generated by a rotary blade assembly.

Other objects, advantages and novel features of the invention will become more apparent from the following detailed description when taken in conjunction with the accompanying drawings.

DETAILED DESCRIPTION OF THE PREFERRED EMBODIMENT

Figure 1:
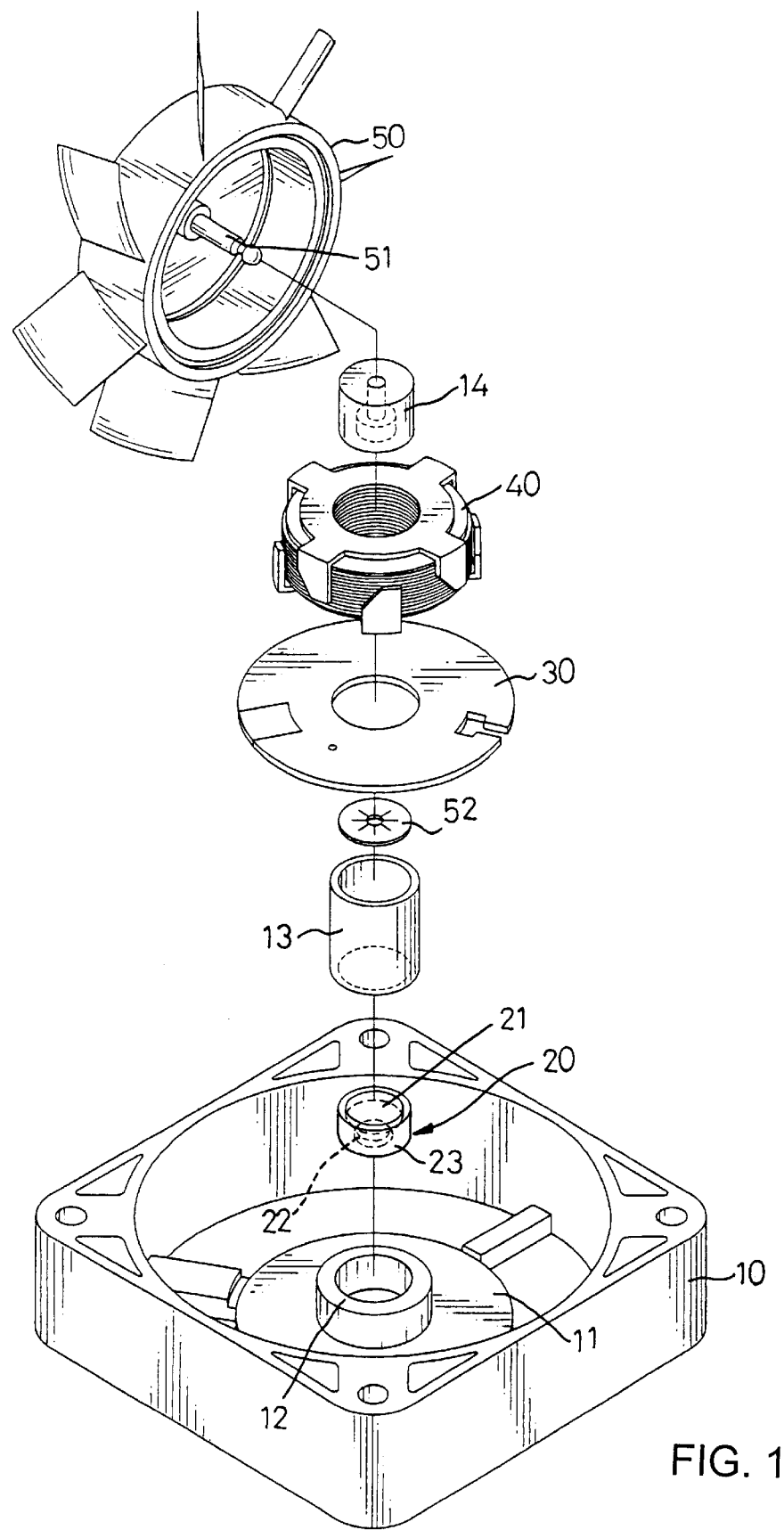
FIG. 1 is an exploded perspective view of an electric fan provided with a buffer pad in accordance with the present invention.
Figure 2:
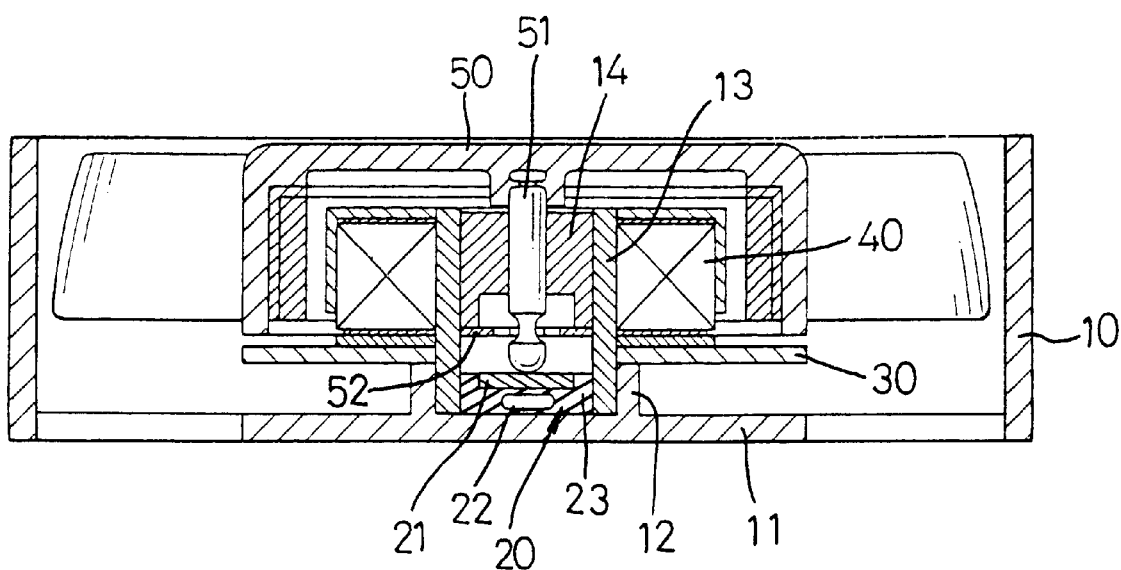
FIG. 2 is a cross-sectional view of the electric fan shown in FIG. 1.
Figure 3:
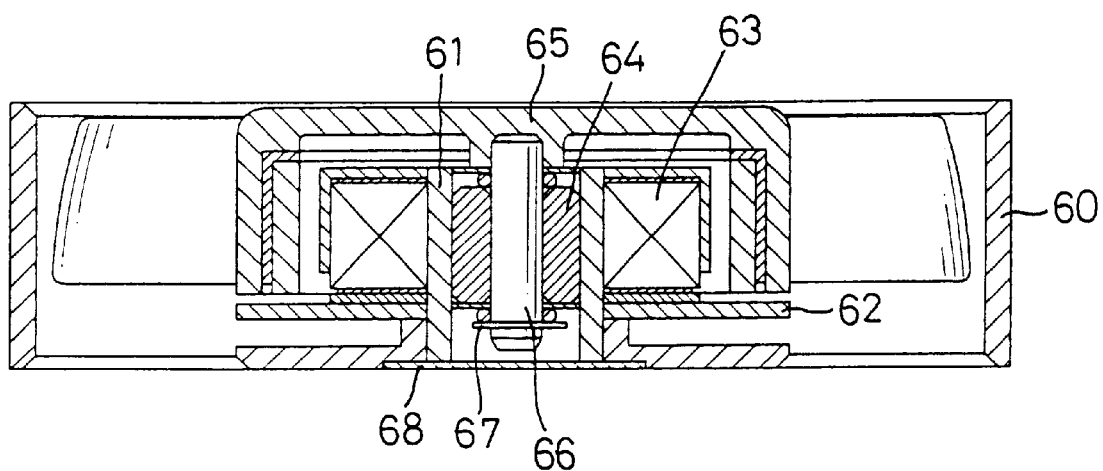
FIG. 3 is a cross-sectional view of a conventional electric fan.
Figure 4:
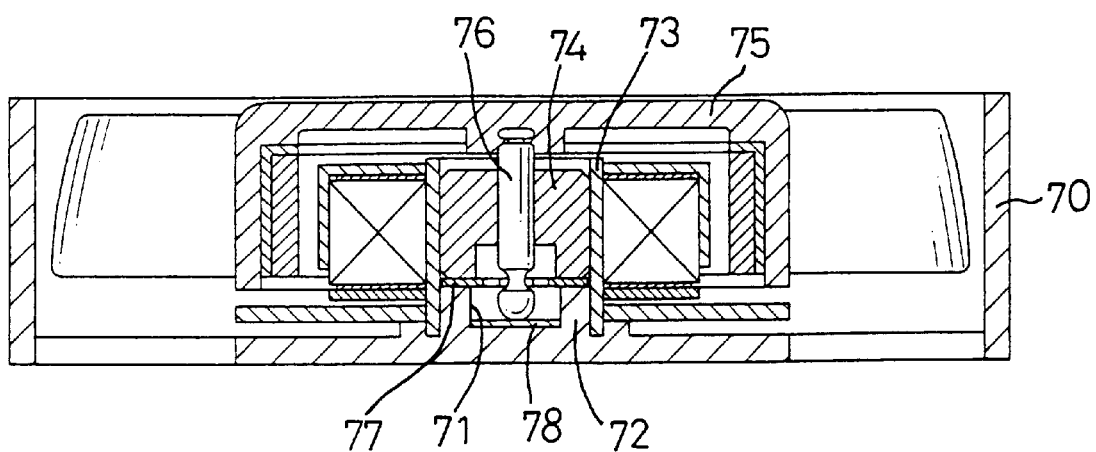
FIG. 4 is a cross-sectional view of another conventional electric fan.

Referring to FIGS. 1 and 2, there is shown an electric fan provided with a buffer pad (20) in accordance with the present invention. The electric fan includes a frame (10) having an open top and a venting bottom (11), with a central tube (12) extending upward from the bottom (11) to receive a sleeve (13).

In the sleeve (13) is fitted tightly a bearing (14) and around the sleeve (13) are mounted a circuit board (30) and an armature (40) electrically connected to the circuit board (30).

A blade assembly (50) is disposed in the open top of the frame (10). The assembly (50) includes a spindle (51) extending therefrom and rotatably supported in the bearing (14). As best shown in FIG. 2, the spindle (51) has a distal end extending beyond the bearing (14), in which the spindle (51) is retained by a retainer (52) held around the distal end of the spindle (51) and located beneath the bearing (14).

The buffer pad (20) is held within the sleeve (13) in a location under the retainer (52). The pad (20) includes a wear-resistant piece (21) abutting the distal end of the spindle (51) and a resilient body (23), made of a material such as silicon gel or polyvinyl (PV), for resiliently supporting the wear-resistant piece (21). The resilient body (23) preferably has a hole (22) laterally defined in the resilient body (23) and which may be either a through-hole, or a blind hole as illustrated, in order to increase elasticity and buffering level thereof.

From the above description, it is noted that the invention has the following advantages:

1. ability to absorb vibrations generated by the rotary blade assembly (50):

Because of the resilient body (23) with the hole (22), the inventive buffer pad (20) can absorb vibrations generated by the rotary blade assembly (50).

2. high efficiency in preventing oil from leaking out of a chamber between the bearing (14) and the pad (20) within the sleeve (13):

Because of the pad (20) consisting of the wear-resistant piece (21) and the resilient body (23), oil in the chamber is less possible to leak out through gaps between the sleeve (13) and the tube (12).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A buffer pad for use in an electric fan having a blade assembly with a spindle extending from said blade assembly and rotatably supported in a bearing, said spindle having a distal end extending beyond said bearing, said buffer pad comprising:

a wear resistant piece adapted to be mounted below the blade assembly and abutted said distal end of said spindle; and a resilient body adapted to be held in place within said electric fan for resiliently supporting said wear resistant piece, wherein said resilient body has at least one hole laterally defined in the resilient body to increase elasticity and buffering level of the resilient body.

2. The buffer pad as claimed in claim 1, wherein said at least one hole is a through hole.

3. The buffer pad as claimed in claim 1, wherein said at least one hole is a blind hole.

4. The buffer pad as claimed in claim 1, wherein said resilient body is made of silicon gel.

5. The buffer pad as claimed in claim 1, wherein said resilient body is made of polyvinyl.

6. A buffer pad for use in an electric fan having a blade assembly with a spindle extending from said blade assembly and rotatably supported in a bearing, said spindle having a distal end extending beyond said bearing, said buffer pad comprising:

a wear resistant piece adapted to be mounted below the blade assembly and abutted said distal end of said spindle; and a resilient body adapted to be held in place within said electric fan for resiliently supporting said wear resistant piece, wherein said resilient body is made of silicon gel.

7. A buffer pad for use in an electric fan having a blade assembly with a spindle extending from said blade assembly and rotatably supported in a bearing, said spindle having a distal end extending beyond said bearing, said buffer pad comprising:

a wear resistant piece adapted to be mounted below the blade assembly and abutted said distal end of said spindle; and a resilient body adapted to be held in place within said electric fan for resiliently supporting said wear resistant piece, wherein said resilient body is made of polyvinyl.

* * * * *